(12) United States Patent
James-Herbert (10) Patent No.: US 7,347,779 B2
(45) Date of Patent: Mar. 25, 2008

(54) COMPUTER GAME CONTROLLER

(75) Inventor: Robert James-Herbert, Eagle Vale (AU)

(73) Assignee: Australian Simulation Control Systems Pty Ltd., Eagle Vale (AU)

( * ) Notice: Subject to any disclaimer, the term of this patent is extended or adjusted under 35 U.S.C. 154(b) by 268 days.

(21) Appl. No.: 10/518,366

(22) PCT Filed: Jun. 17, 2003

(86) PCT No.: PCT/AU03/00754

§ 371 (c)(1),
(2), (4) Date: Jul. 20, 2005

(87) PCT Pub. No.: WO04/000430

PCT Pub. Date: Dec. 31, 2003

(65) Prior Publication Data

US 2005/0282632 A1    Dec. 22, 2005

(30) Foreign Application Priority Data

Jun. 19, 2002    (AU) .................................... PS 3042

(51) Int. Cl.
*A63F 13/06* (2006.01)
(52) U.S. Cl. ............................. 463/36; 463/36; 463/40; 434/30
(58) Field of Classification Search ................. 463/36, 463/43; 434/30
See application file for complete search history.

(56) References Cited

U.S. PATENT DOCUMENTS 5,252,068 A * 10/1993 Gryder .................... 434/30
5,431,569 A    7/1995 Simpkins et al.
5,490,784 A * 2/1996 Carmein ................... 434/55

(Continued)

OTHER PUBLICATIONS

International Search Report dated Aug. 27, 2003 for International Application No. PCT/AU03/00754.

*Primary Examiner*—Xuan M. Thai
*Assistant Examiner*—Masud Ahmed
(74) *Attorney, Agent, or Firm*—Hogan & Hartson LLP (57) ABSTRACT

A computer game controller (1) includes a tripod (12) from which a game player is suspended in a chair harness (52), or the like. A bearing (20) allows movement of the chair either back and forth and side to side, or rotationally about a vertical axis. Movement of the chair is monitored by a sleeved stem which moves in the same manner as a joystick plus rotational controller. Adjustable handlebars (24) including control means are fixed to the frame. A player supported by the chair or harness may move the chair or harness to control a car, plane, bike, avatar, or other sprite in the computer game. Other control functions are mounted on the handlebars and are operably by the player's hands. In use a player gasps the handlebars and controls the game's sprite by moving his or her body to move the sleeved stem's joystick type control. Thus the player is able to utilise their entire body to control action in the computer game, and exercise at the same time as playing the game. Elastic straps (70, 72, 74) may extend between the chair, harness or the like to increase the effort required for the player to move, thus providing increased levels of exercise. The frame is collapsible for storage and transport purposes. The handlebars and chair are adjustable to suit the game being played on the console and the size of the player.

11 Claims, 7 Drawing Sheets

U.S. PATENT DOCUMENTS 5,782,639 A * 7/1998 Beal .......................... 434/29
5,860,861 A   1/1999 Lipps et al.
5,908,300 A   6/1999 Walker et al.
5,947,824 A   9/1999 Minami et al.
6,000,942 A   12/1999 Hogue et al.
6,052,114 A   4/2000 Morifuji
6,270,414 B2  8/2001 Roelofs

* cited by examiner

COMPUTER GAME CONTROLLER

FIELD OF THE INVENTION

This invention relates to an improved computer game controller.

BACKGROUND OF THE INVENTION

With its growth in popularity, across a wide age group, home computer gaming is now a major domestic pastime. A typical home computer game console system will includes a computer containing the main central processing unit or CPU, a visual display unit (VDU) on which the game being played is displayed and some form of interactive unit or game control means such as a keyboard, joy stick, or joy pad enabling a player or players to react to and influence events during the course of game. Home computer games are sometimes played on a home computer such as a PC in which case either the keyboard or a separate game controller such as a joy stick is used as the game controller, but more commonly, the CPU forms part of a dedicated computer game console using a domestic television as the VDU.

Over the years, computer gaming systems have increased markedly in speed, sophistication and graphics capabilities. Game controllers have also improved. When playing a driving game for example, it is possible to control a vehicle appearing in the driving game using a customised steering wheel and pedals rather than a joy pad, joystick or the like, although such controllers are generally not supplied with computer gaming systems and have to be purchased separately. It is also possible to purchase highly sophisticated joysticks and other hand operated game controllers in the after market.

However, despite the many improvements in game controllers, playing any driving, riding or flying game on a computer essentially remains a sedentary function. Whilst the player is able use both their hands and feet when they are playing a driving game, when playing other games, players generally only use their hands with the result that whilst playing a computer game may be involved and mentally stimulating, it does not result in a great deal of physical involvement for the player.

Children in particular, are keen players of computer games from an early age, although computer games tend to be more popular with older children and teenagers. The amount of time some children and teenagers spend playing computer games is recognised as being a problem by many parents who may feel that the time their children spend playing computer games is wasted and that their should be playing sport or physical games getting more physical exercise and achieving health benefits from doing so. There is also a growing recognition of an increasing tendency for children, even very young children, to be overweight and even obese. Obesity in children is known to be a major factor in childhood diabetes. Whilst children's diets particularly the consumption of junk foods is a major cause of obesity, lack of exercise is a significant contributing factor. However while parents recognise that children should be getting more exercise for the good of their health they also recognise that it is generally safer for their children to be at home playing computer games than outside playing in a public area such as a park or the like.

It is an aim of the present invention to provide a computer, games controller in which a player's physical involvement in their chosen gaming activity can be increased.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first broad aspect of the present invention, there is provided a means for controlling a computer game in which a player is suspended in a chair harness or the like from a control means, the arrangement being such that the player may move the chair of harness to control functions on the computer game.

More specifically, the invention provides a computer game controller comprising means for suspending a player, in a support means such as a chair, harness or the like, from a bearing means, the bearing means including a control means for inputting position signals to a computer to control the movement of a sprite such as a vehicle or character, in a computer game, the bearing allowing side to side, forwards and backwards, and rotational movement of the player about the bearing and including selectively operable locking means for preventing either rotational movement or side to side and forwards and backwards movement, the arrangement being such that movement of the player's body may move the chair or harness to control the sprite in the computer game further including resistance means for increasing the resistance to movement of the support means relative to the bearing, thereby providing physiotherapy exercise for the player.

The control means is typically an inverted joy stick. Movement of the game player performs the normal up, down and side to side control functions of the joy stick. Other control functions of the joy stick may be mounted on handlebars, steering wheel or other control means that are operable by a player's hands and that are fixed to the frame from which the player is suspended. A rotational controller for control based on rotation about a vertical axis may also be provided.

One advantage of the present invention is that a player of computer game is able to utilise their entire body in a seated or prone position to control action in any type of computer game.

A further advantageous feature of the present invention is that the invention is relatively straight forward to implement since the control means can simply be an inverted joy stick and the movement of the car, motorbike, spaceship, other vehicle, computer game character, or the like whose movement and actions are being controlled in the game whether in first or third person. As used herein the word "sprite" will be used to designate the vehicle, character, avatar or whatever object or person whose movement or actions are controlled in a computer game by the game controller.

Whilst the game controller could of course be utilised to control any form of sprite in a computer game, the game controller is most preferably used to control a vehicle such as a motor car, motorbike, aeroplane, spacecraft or the like.

All of the controls are mounted on handle bars which are attached to a frame which is most preferably a tripod. The handle bars may include a variable height adjustment. A console is mounted on the handlebars.

The player holds onto the fixed handlebars by moving the chair or harness in which they are sitting or lying to actuate the electronic control which in the same way as moving a normal joy stick, controls the vehicle in the computer game.

Typically a T-bar is suspended from the apex of the tripod. A chair may be removably attached to the T-bar. An adjustable footrest may be attached to the chair.

The invention can also be used in physiotherapy applications, or with exercise equipment suspended from the frame.

The legs of the tripod are preferably hinged so that the frame may be folded in two for storage or transport.

The upper end of each leg of the tripod may hinged to the head/apex of the tripod so that the tripod may be folded up in like manner to an umbrella.

In a particularly preferred embodiment, a mat is provided on which the frame rests in use. Three plastic mouldings are fixed to the mat defining three slots, one for each foot of each leg of the frame so that the feet can be locked in the mouldings to prevent the frame from splaying outwardly.

The frame is most preferably made of aluminium for minimum weight and maximum portability.

BRIEF DESCRIPTION OF THE DRAWINGS

Specific embodiments of the present invention will now be described by way of example only and with reference to the accompanying drawings in which.

DETAILED DESCRIPTION OF A PREFERRED EMBODIMENT

Figure 1:
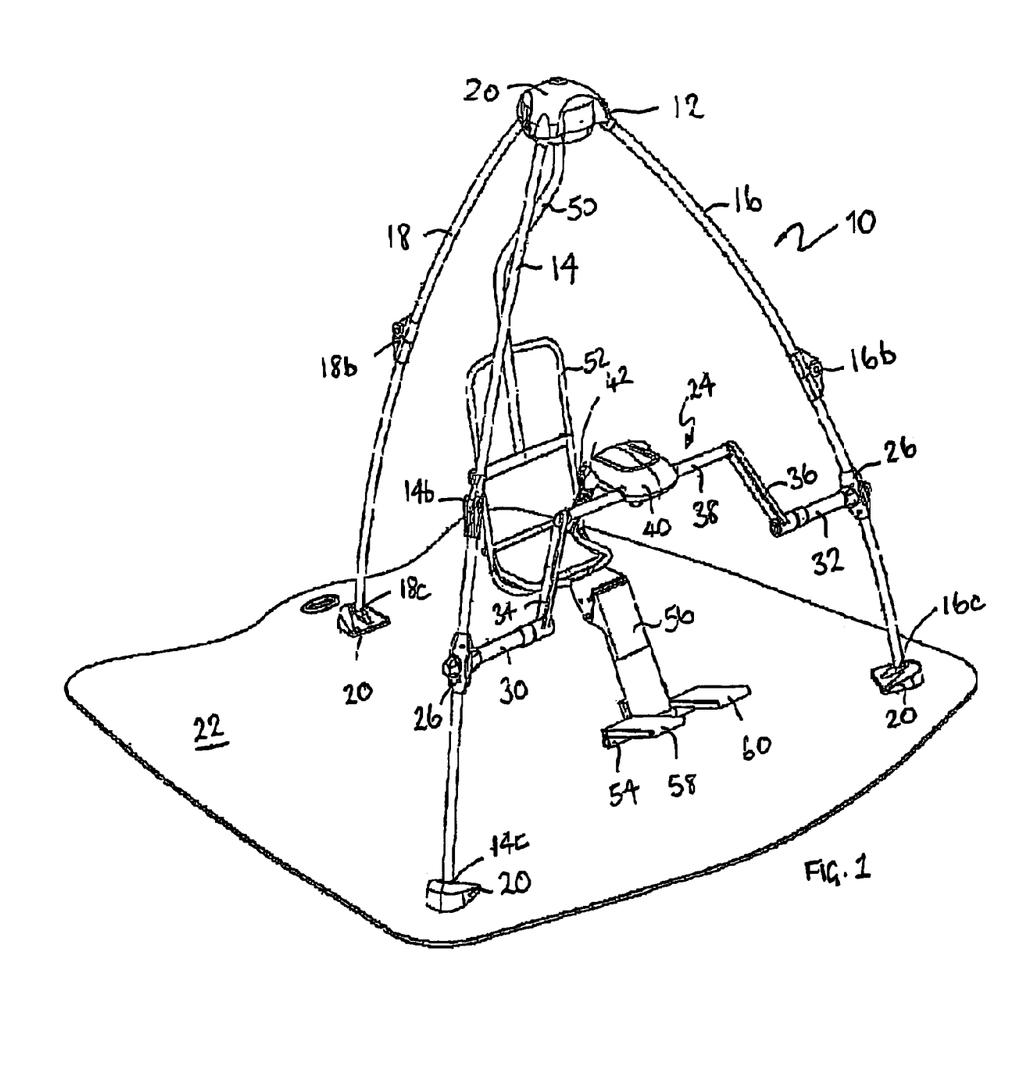
FIG. 1 shows a game controller apparatus embodying the present invention configured for a driving game.

Referring to the drawings, FIG. 1 shows an embodiment of a whole body game controller 10 embodying the present invention. In FIG. 1, the game controller 10 is configured as a game controller for a computer game simulating the driving of a motor vehicle (not shown).

Figure 5:
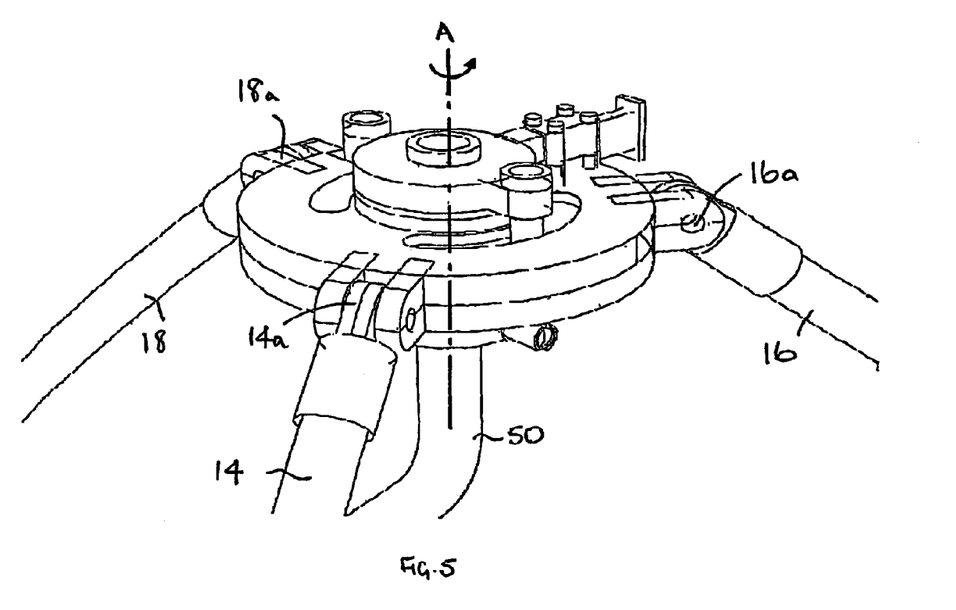
FIG. 5 is an enlarged view of a head of the tripod of the apparatus of the present invention.

The game controller 10 includes a frame in the form of a tripod 12 having two front legs 14, 16 and one rear leg 18. The top of each leg is connected to a top or head 20 of the tripod about respective pivots 14a, 16a and 18a as shown in more detail in FIG. 5. The legs themselves, are gently curved and are hinged about their respective mid points 14b, 16b, 18b so that they can be folded in two. The feet 14c, 16c, 18c of each leg locates in and is locked in a cylindrical hole in a plastic moulding 20 fixed to a mat 22 on which the tripod sits. The mat is made of a fibre glass reinforced plastic fabric, although any strong flexible material would be suitable for forming the mat. The locking of the feet to the mat prevents the legs of the tripod from splaying outwards.

A handlebar assembly 24 extends between the front two legs of the tripod. The handlebar assembly 24 is mounted to the front legs 14, 16 by means of plastic fittings 26 which can be slid up or down the legs so that the height of the handlebar assembly is adjustable. The handlebar assembly should be detachable from the legs for storage and transport of the apparatus, but the specific manner in which the handlebar assembly is connected to the frame is not critical.

As shown in FIG. 1, the handlebar assembly 24 includes two co-axial stub portions 30, 32 linked by two radial arm portions 34, 36 to a central bar 38 extending parallel to the stub portions. The radial arm portions 34, 36 pivot about the stub portions to enable adjustment of the position of the central bar 38 relative to the stub portions. A control console 40 including handle grips 42, 43 (not shown in FIG. 1) is attached to the central bar 38.

A T bar 50 (best seen in FIG. 2) depends down from the head of the tripod. The T-bar 50 is suspended from the head of the tripod by a bearing such that it can be swung backwards and forwards and side to side or rotated about a vertical axis A. Movement of the T-bar is monitored by a sleeved stem that is located in the centre of the bearing. The sleeved stem moves in same way as a standard joystick and transmits the same control instructions as a standard joystick either side to side and back and forth, or rotation about vertical axis A. The head which is shown in more detail in FIG. 5 includes a locking means not illustrated, which can be activated to allow either side to side and forwards and backwards movement relative to the consol or vertical rotation.

As shown in FIG. 1 a chair 52 is removably attached to the T-bar 50. The chair includes a foot rest 54 in the form of a bar which is mounted to the chair by an length adjustable member 56 which is pivoted to the chair 52. Foot pedals 58, 60 are removably attached to the foot rest 54.

In the configuration for use in simulating driving a car shown in FIG. 1, vertical rotation about the bearing about axis A is permitted and side to side and backward and forward movement is locked off. The player grasps the handle grips which are angled down to simulate a steering wheel and turns the vehicle by pushing on the handlebars and twisting their body. The pedals 58, 60 typically control acceleration and braking as in a normal car.

Figure 4:
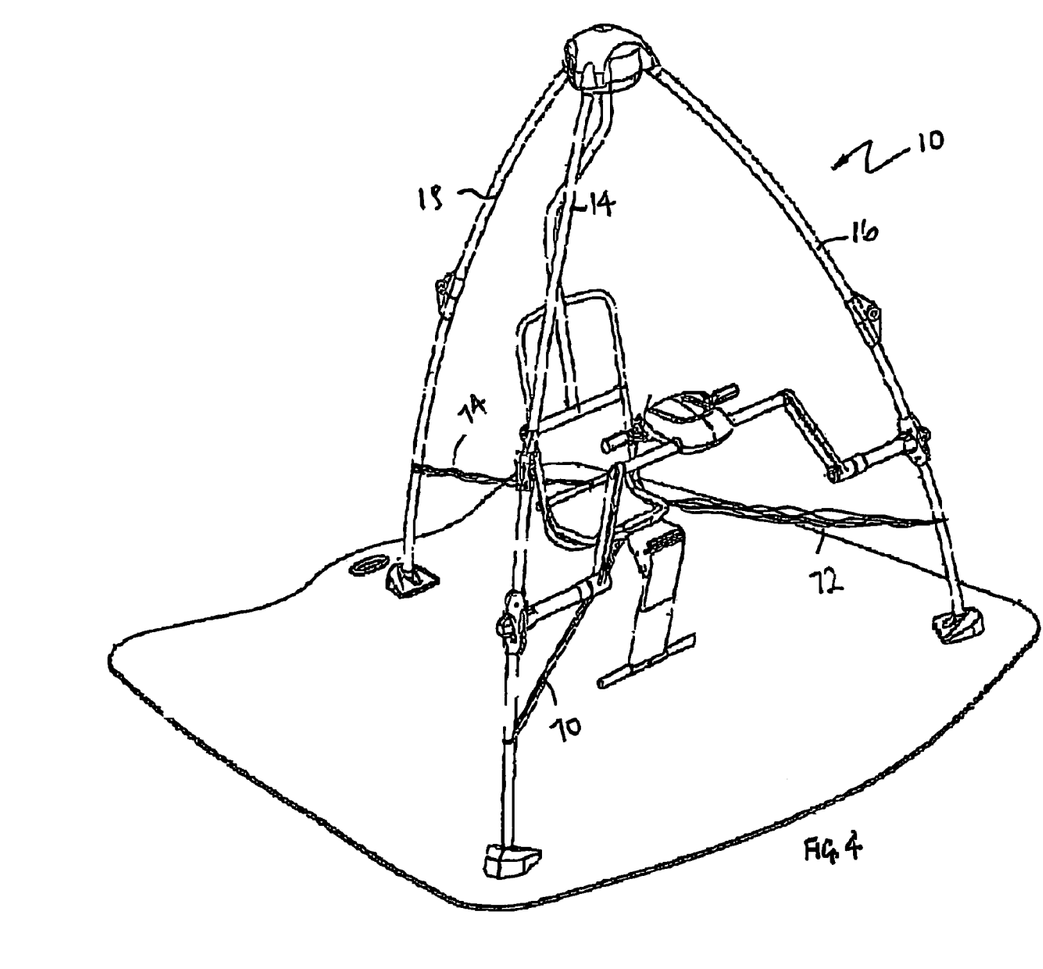
FIG. 4 shows an apparatus of the present invention configured for a motorcycle game.

The game controller is adjustable to suit different types of computer game. For example FIG. 4 shows the apparatus configured for a motorbike riding game in which the handle grips are pivoted such that they extend generally parallel to the central bar 38 and, as in a typical motorbike, the right handle bar acts a twist grip throttle for the motorbike in the game. Also the foot pedals 58, 60 are removed and the length adjustable member 56 is pivoted so that the foot rest 54 is located generally beneath the seat as occurs in a real motorbike, so that the rider can adopt a more realistic position simulating the riding of a real motorbike. In the motorcycle configuration as shown in FIG. 4, backwards and forwards, and side to side rotation is typically permitted whilst vertical rotation is locked off.

Also shown in FIG. 4, are three optional elastic straps 70, 72, 74 which extend between the chair and each leg of the tripod. The straps make it more difficult for the player of the computer games to move the chair and thus increase resistance of movement of the chair. This allows the game controller apparatus to be used as an exercise type apparatus. The level of exercise a game player will get from using the controller will depend on the elasticity of the straps which may be adjustable to suit the weight and fitness of the person using the controller. The straps may also be used with the game controller in any of the other configurations but are omitted for clarity reasons.

Figure 2:
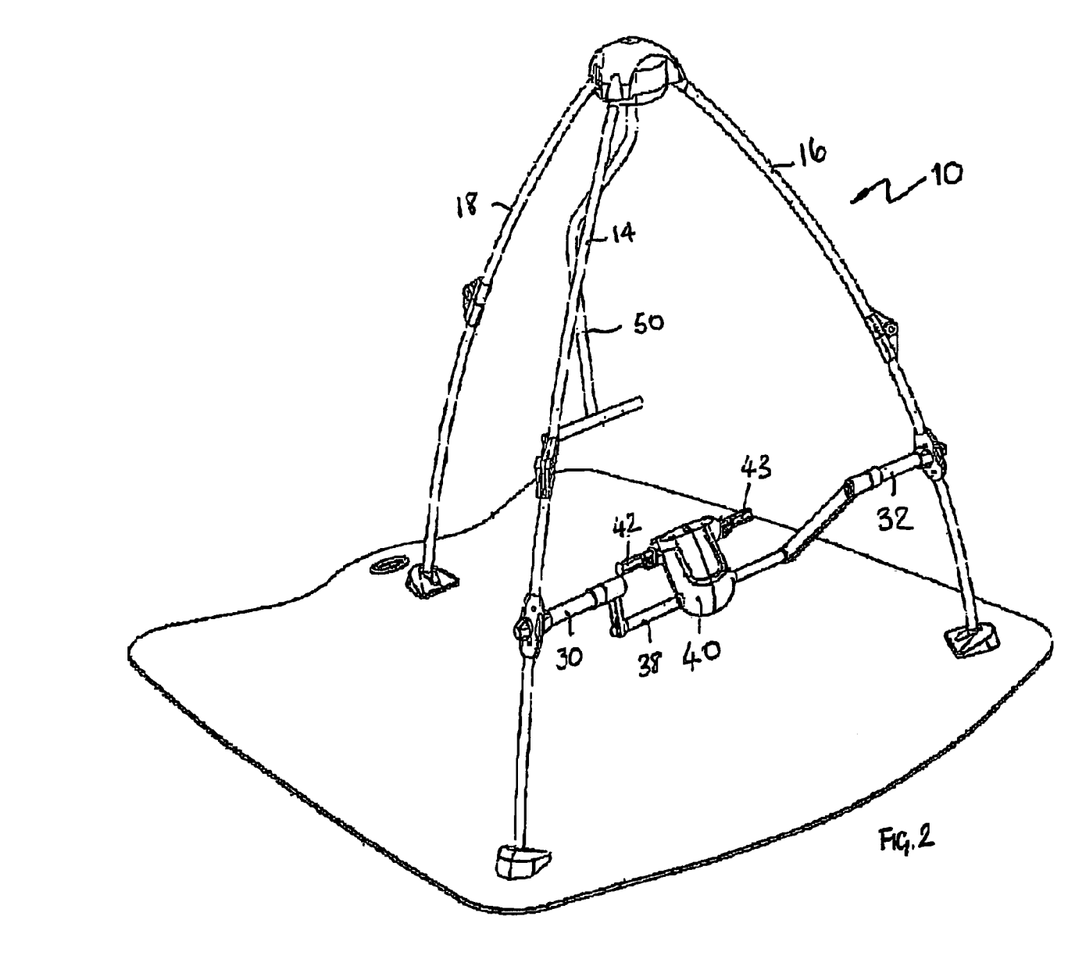
FIG. 2 shows a perspective view of the apparatus of the present invention configured for a flying game, but excluding a player harness.
Figure 3:
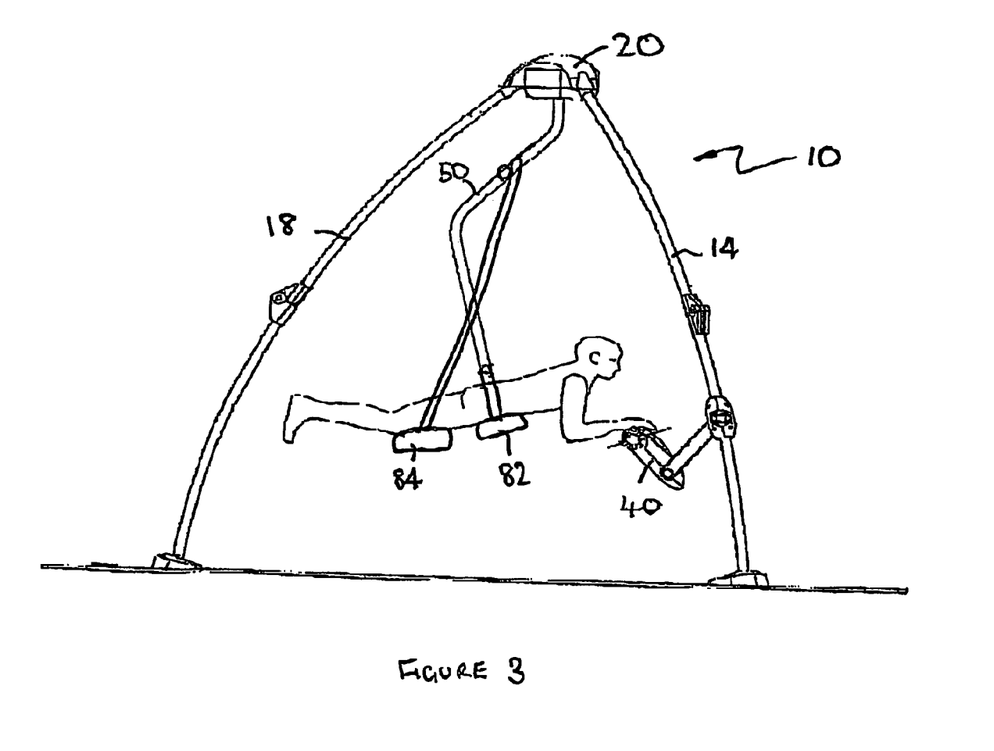
FIG. 3 shows a side view of the apparatus of FIG. 2 configured for a flying game, including player and harness.
Figure 6:
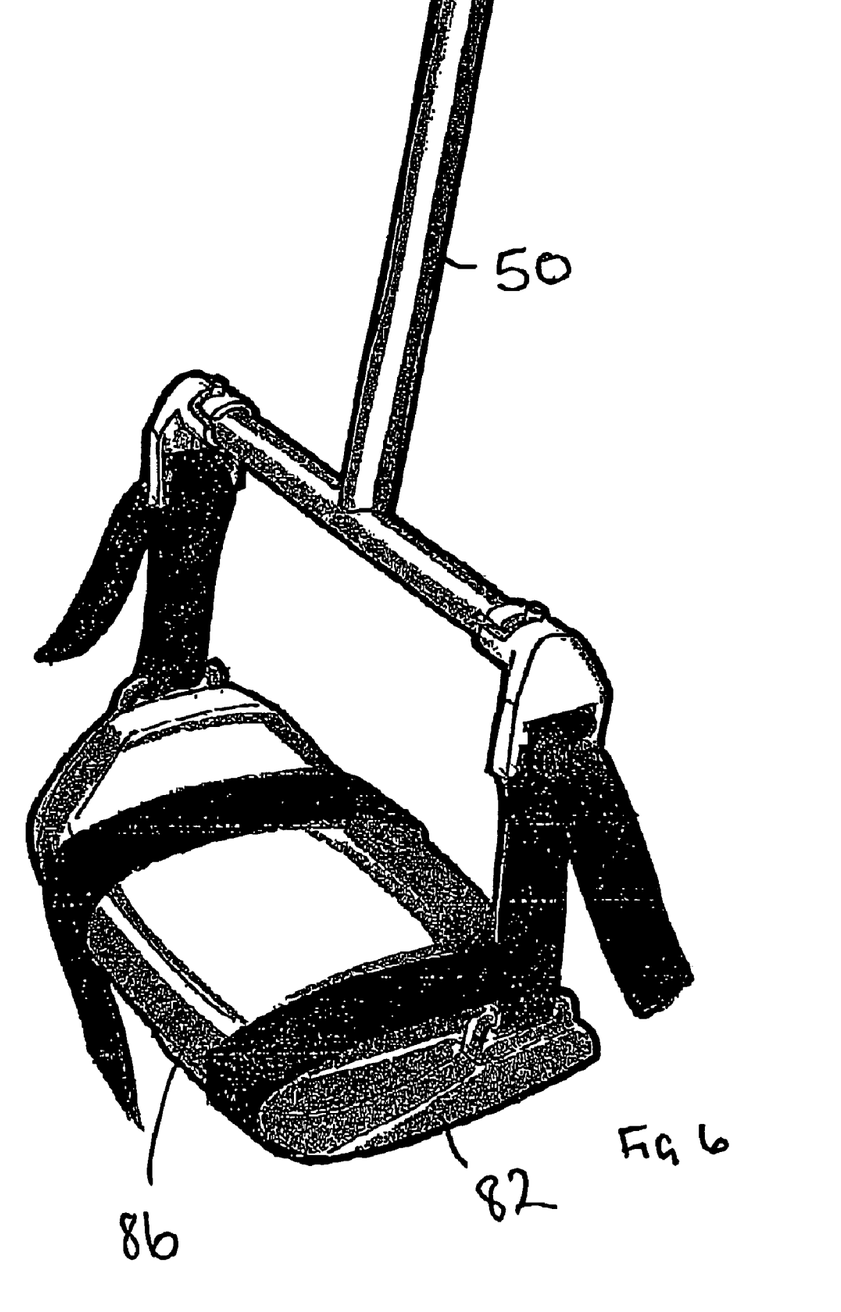
FIGS. 6 and 7 illustrate components of a two part harness.
Figure 7:
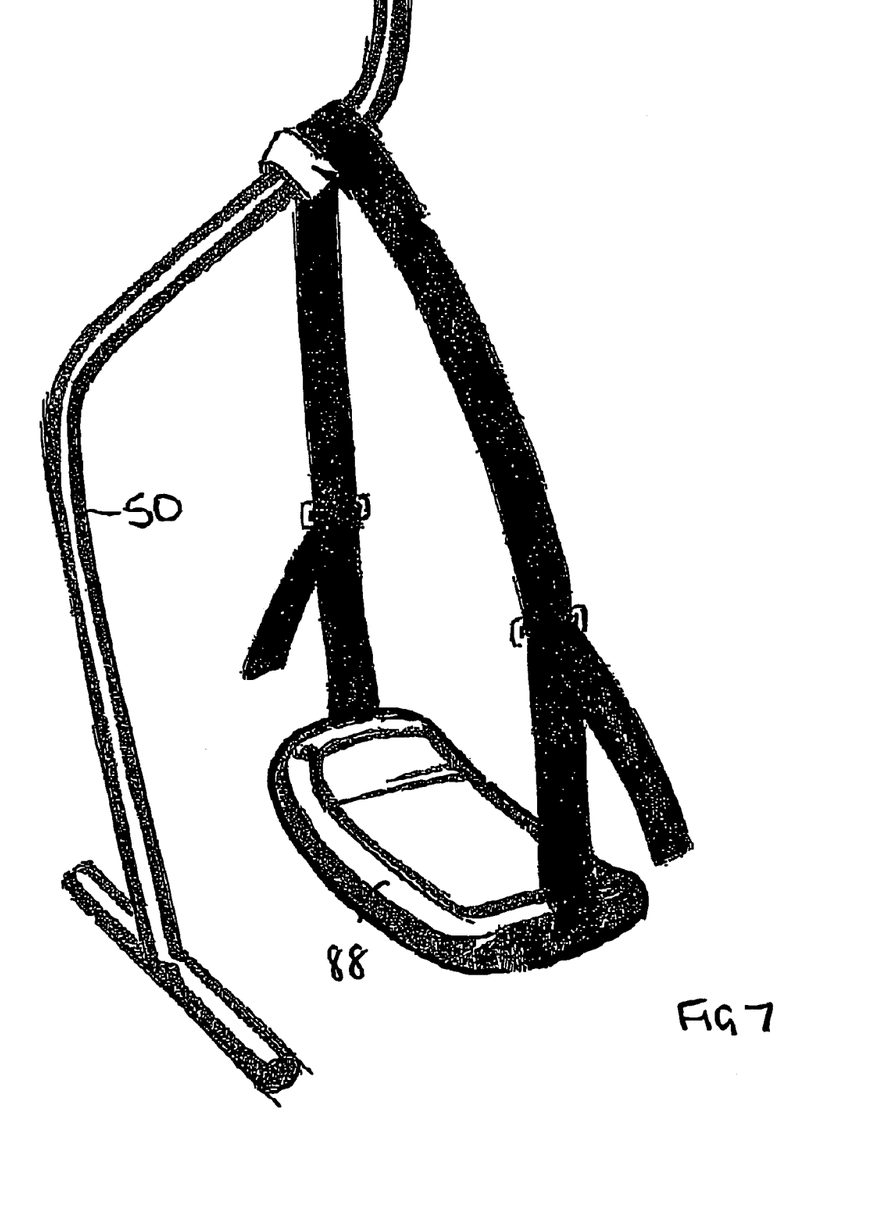

As shown in FIGS. 2 and 3, it is also possible to configure the apparatus for flying game with the player in a prone position. FIG. 2 shows the apparatus with the chair removed 52 and the console 40 lowered and adjusted so that the player can operate it in a prone position by rotating the central bar about the stub portions 30, 32 and pivoting the console 40 so that it is at an angle of about 300 to the horizontal. With reference to FIG. 3 a player 80 is suspended by a two part harness shown schematically one first part 82 of the harness being suspended from the "T" of the T-bar supporting the players chest, and the other part 84 hanging from an upper part of the T-bar near the head 20 supporting the players legs. When the elastic straps are used they are connected to the first part 82. FIGS. 6 and 7 illustrate the harness components in more detail each comprising a cushion 86, 88 suspended by webbing. The webbing 90 supporting the leg/thigh cushion 88 is adjustable and incorporates a releasable cleat mechanism so that the player can mount the game controller apparatus resting his chest on the chest cushion 82 and place their legs on the cushion 84 with the webbing 90 extended so that the cushion 88 is on or close to ground and then using a cleat mechanism shorten the webbing straps to raise the cushion to the operative position shown in FIG. 3.

Clearly, the exact configuration of the apparatus may be changed for different simulations as well as simulating flying, driving a bike, driving a car, the apparatus may also be used to simulate a plane, spaceship, or indeed, used to control any type of sprite including an avatar in a computer game, and although it is best suited to driving or flying games there is no reason why it could not be used to control the movements of a sprite such as a monkey, plumber or a hedgehog or any computer game character, although the players movements would not necessarily logically correspond with those of the sprite. The apparatus may also be dismantled for storage and transport by detaching the handlebar assembly 24, and the chair, removing the feet 14c, 16c, 18c of each leg of the tripod from the plastic mouldings 20 and folding the legs of the tripod towards each other, and also in two about the hinges.

It will be appreciated that as in all computer game controllers electronic modification may be required for the game controller to be used with different gaming consoles. The electronics used are standard in the art and the necessary adjustments are a matter of routine for the person skilled in the art.

The dimensions and materials used for making the apparatus may be varied however aluminium is preferred as the material for the frame and chair due to its strength to weight characteristics.

It will be appreciated that the use of a player's entire body in playing the game, particularly combined with the use of the elastic straps, will create an exercise value in game playing which has not previously been available and will also enable the use of the apparatus for physiotherapy and other applications.

It will be appreciated that it is possible to replace the chair/harness with a wheel-less pedal bike or motorbike frame for added realism. Also exercise apparatus could be suspended from the frame when appropriate games are developed to use the apparatus as an exercise/remedial therapy facility.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A computer game controller comprising means for suspending a player from a tripod, in a support means such as a chair, or harness, from a bearing means wherein bearing means located on top of the tripod, the bearing means including a control means for inputting position signals to a computer to control the movement of a sprite such as a vehicle or character, in a computer game, the bearing allowing side to side, forwards and backwards, and rotational movement of the player about the bearing and including selectively operable locking means for preventing either rotational movement or side to side and forwards and backwards movement, the arrangement being such that movement of the player's body may move the chair or harness to control the sprite in the computer game, the controller further including resistance means for increasing the resistance to movement of the support means relative to the bearing, thereby providing physiotherapy exercise for the player.

2. A computer game controller as claimed in claim 1 wherein the means for suspending a player comprises a frame and wherein a handlebar means which can be grasped by the player in use is attached to the frame.

3. A computer game controller as claimed in claim 2 wherein the position of the handlebar means is adjustable.

4. A computer game controller as claimed in claim 1 wherein the control means is of the joy stick type or of a rotational control wheel type.

5. A computer game controller as claimed in claim 1 wherein game control means, other than movement control means for the sprite, are located on handle bars, steering wheel or other control means that are operable by a player's hands.

6. A computer game controller as claimed in claim 2 wherein the frame may be folded down, dis-assembled or otherwise collapsed for storage and transport.

7. A computer game controller as claimed in claim 1 wherein the player is suspended in a chair and wherein the chair includes an adjustable foot rest.

8. A computer game controller as claimed in claim 2 wherein the resistance means comprise an elastomeric strap extending between the frame and the support means.

9. A computer game controller comprising:
   a tripod having a head incorporating a bearing means;
   support means for suspending a player from the bearing means, the bearing means including a position control means for inputting position signals to a computer for controlling the movement of a sprite such as a vehicle or character in a computer game being played on the computer;
   handlebar means which may be fixed relative to the tripod and grasped by the player;
   further including resistance means for increasing the resistance to movement of the support means relative to the bearing;
   the arrangement being such that movement of the player grasping the handlebar means and moving their body may cause rotational, side to side or back and forth movement of the bearing causing a corresponding movement in the control means with the resistance means increasing the effort required by the player to move the support means thereby providing physiotherapy or exercise to the player.

10. A computer game controller as claimed in claim 9 wherein the position control means is of the joy stick type or a rotational wheel type.

11. A computer game system for playing a computer game comprising a computer console, a display means for displaying a game being played on the computer game system, and a game controller as claimed in claim 1 or claim 9 wherein movement of the body of a player suspended from the game controller is arranged to cause movement of a sprite in the game being played.

* * * * *